(12) United States Patent
Kerner et al.

(10) Patent No.: US 6,240,364 B1
(45) Date of Patent: May 29, 2001

(54) METHOD AND DEVICE FOR PROVIDING TRAFFIC INFORMATION

(75) Inventors: Boris Kerner, Stuttgart; Mario Aleksic, Trossingen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/498,979

(22) Filed: Feb. 7, 2000

(30) Foreign Application Priority Data

Feb. 6, 1999 (DE) .............................. 199 04 909

(51) Int. Cl.⁷ .................................................... G06G 7/78
(52) U.S. Cl. ..................... 701/210; 701/201; 701/204; 701/117; 701/23; 342/357.09; 340/988; 340/990; 340/995
(58) Field of Search .................................. 701/200, 201, 701/204, 210, 117, 118, 23, 24, 26; 340/988, 990, 995; 342/357.09

(56) References Cited

U.S. PATENT DOCUMENTS

| | | | |
|---|---|---|---|
| 6,098,016 | * | 8/2000 | Ishihara .............................. 701/209 |
| 6,101,443 | * | 8/2000 | Kato et al. .......................... 701/210 |

FOREIGN PATENT DOCUMENTS

| | | |
|---|---|---|
| 19519066 | 5/1996 | (DE) . |
| 19526148C2 | 6/1997 | (DE) . |
| 19647127A1 | 5/1998 | (DE) . |
| 197 54 483 | 6/1998 | (DE) . |
| 19806197A1 | 8/1998 | (DE) . |
| 198 35 979 | 2/2000 | (DE) . |
| 0 884 708 | 12/1998 | (EP) . |
| WO 92/14215 | 8/1992 | (WO) . |

OTHER PUBLICATIONS

E.W. Dijkstra, A Note on Two Problems In Connexion with Graphs, (1959) pp. 269–271. No Month.

* cited by examiner

Primary Examiner—William A. Cuchlinski, Jr.
Assistant Examiner—Yonel Beaulieu
(74) Attorney, Agent, or Firm—Evenson, McKeown, Edwards & Lenahan, P.L.L.C.

(57) ABSTRACT

A method and a device for providing traffic information for a given vehicle in a road network whereby, starting with a given starting location and starting time, current and forecast traffic data are determined at a traffic center and prepared in such fashion that they can be transmitted to a given vehicle. Traffic data present at the traffic center, which include at least the current and forecast functional values of a traffic-dependent cost function for the individual route paths, is used to calculate, as a function of the starting location and the starting time, a cost function optimized route to each route path. A corresponding arrival time is then determined to each route path. The cost function value that belongs to each determined arrival time is then selected. The cost function values thus selected are prepared, if necessary, with additional traffic data as traffic information that can be transmitted.

11 Claims, 8 Drawing Sheets

METHOD AND DEVICE FOR PROVIDING TRAFFIC INFORMATION

BACKGROUND AND SUMMARY OF THE INVENTION

This application claims the priority of German Application No. 19904909.2, filed Feb. 6, 1999, the disclosures of which are expressly incorporated by reference herein.

The invention relates to a method for providing traffic information to a given vehicle in a road network as well as a device suitable for working such a method.

Traffic information methods and devices provide road vehicles with information that characterizes the traffic situation to be used for guidance, route selection, travel time estimation, etc. Depending on whether the processing of the traffic information takes place primarily aboard the vehicle or at a traffic center, a distinction is made between autonomous systems and center-based systems. Another distinction is between dynamic guidance systems and static guidance systems. In dynamic systems traffic situation data is taken into account when calculating the optimum route.

In center-based dynamic guidance systems, optimum routes are calculated in a traffic center and relevant data are transmitted to the vehicle. The term "optimum" is used herein to refer to a route for which a cost function, which serves as the basis for an optimization procedure, assumes an optimum value, e.g. a minimum, with the travel time frequently being used as a cost function. A special algorithm for calculating the fastest routes in a road network is described in the journal article by E. W. Dijkstra, "A note on Two Problems in Connection with Graphs," Numer. Math. 1, page 269. Alternatively, however, another cost function can be used. For example, energy consumption required to travel a given section of road referred to herein below as "route path" or "path" for short, can be used as a cost function. In autonomous dynamic guidance systems, the optimum route is calculated aboard the vehicle on the basis of current traffic information transmitted from a traffic center to the vehicle, for example in the form of conventional TMC traffic reports.

Most known dynamic guidance systems are limited to providing and examining current traffic information, i.e. information on the current traffic situation on the road network as obtained especially by traffic situation detectors distributed over the road network. However, the traffic situation, especially conditions relative to traffic flow such as traffic jams and the like (and hence the optimum route between two points in the road network), can change dramatically in a very short time. This can result in drastic deviations in the value of the cost function for an actual trip, such as the travel time or the energy consumption of the vehicle, from the estimated cost function value associated with the optimum calculated route.

Known traffic situation forecasts take the forecast traffic data in addition to the current traffic data, into account for vehicle guidance, route determination, and/or travel time estimation; see for example German Patent Documents DE 195 26 148 C2, DE 196 47 127 A1, and DE 198 06 197 A1, as well as the previously unpublished older German Patent Application 198 35 979.9.

Traffic forecasting methods of this kind are performed at a traffic center because of the associated computing required to be able to provide the forecast traffic data in addition to the current data to participating vehicles. The volume of data here poses a problem since traffic information, because of the limited capacity of the available communications channels, can be transmitted only in very limited quantities from the center to an individual vehicle. Additionally, it is frequently not known precisely at the center, which traffic information is required by a guidance system aboard a vehicle to calculate traffic-dependent optimum routes with a route-searching algorithm available aboard the vehicle. Therefore, there is a need for methods and devices by which reliable traffic information that can be readily evaluated by the vehicle can be provided in the smallest possible quantity of transmitted data, taking into account both current data and timely forecast data forecast about the anticipated traffic situation for the relevant stretches of road.

In German Patent Document DE 198 06 197 A1, methods and devices are described in which current and forecast traffic data are transmitted from a traffic center, organized in accordance with so-called target areas, and transmitted over a corresponding communication channel to the vehicle. To create the target areas, sequential forecast times are determined starting at a starting time and a road network partial area is assigned as a target area area in which the vehicle is expected to be situated during the time, between the forecast time in question and the next forecast time. To determine the target areas, it is proposed to use the anticipated distance of the vehicle from the starting location, as obtained at the time in question, from stored speed data on the average assumed vehicle speed in the road network in question, which can be specified as fixed or a function of the type of road.

The present invention provides a method and a device whereby, at relatively low expense, comparatively reliable and accurate traffic information can be provided for further use by a vehicle on a given road network, especially by an autonomous dynamic guidance system present aboard the vehicle for guidance, route planning, etc.

Traffic information provided by the method and device of the present invention includes a determination, performed by the traffic center, and beginning at a given starting location and starting time, of routes that are optimum relative to a specified traffic-dependent cost function such as travel time, to the route paths of at least one road network partial area containing the starting location. The route-search method operates as a function of traffic data taking into account traffic data that are in the traffic center, current, and forecast, which includes the current and forecast functional values of the cost function for the individual route paths of the road network as well as additional data, depending on the application, on the current and future traffic situation.

The current traffic condition data, as well as at various specified forecast times, for the route paths under consideration are stored at the traffic center, so that they can be called up or can be provided at any time by a conventional traffic forecasting method. The corresponding previously-estimated arrival time, at which a vehicle that starts at the starting location at a starting time and travels the optimum route, can be expected to reach the route edge in question results directly from the optimum route calculated for the individual route path.

The cost function value, which is associated with the arrival time by the optimum route is chosen from the current and forecast values of the cost function for each route path, i.e. the values that can be expected at the specified forecast times. In addition to the selected cost function value, additional traffic data, which are stored at the traffic center for the given route path and the given arrival time can, be selected, as needed. According to the invention, the cost function values for the individual route paths of the road network partial area under consideration are selected in a timely fashion and in accordance with the calculated optimum routes. The partial areas are processed in the center as traffic data that can be transmitted, or in any case constitute a part of the traffic data prepared for transmission.

With this procedure, relatively reliable current and forecast traffic situation data can be produced as compactly as possible, when taking transmission capacity into account. In particular, a guidance system aboard the vehicle with a conventional design without any structural changes is able, with such transmitted traffic information, to perform optimum guidance or route planning which not only employs the current traffic situation but also takes into account the anticipated future traffic situation, because the future traffic situation is provided to the system through the transmitted cost function values for the relevant route paths. In addition, improved accuracy, for such autonomous guidance processes using the traffic information provided according to the invention, is achieved by comparison with conventional systems in which the transmitted traffic information contains course information about any anticipated traffic state objects, such as traffic jams, slow traffic, etc. in a large area at a later forecast time without requiring the transmission of larger amounts of data. In addition, the accuracy with which the cost function values is chosen when compared with the accuracy with which any kind of target areas are conventionally determined (i.e. distance zones around the respective starting location) is increased and no distinction is made in traffic information by such target areas or distance zones.

In a particular embodiment the preparation of the traffic information to be provided includes placing the transmission-relevant traffic data into a data format used aboard the vehicle, i.e. a data format that is used in the terminal aboard the vehicle, which receives and passes on traffic information after it is transmitted. As a result, existing vehicle terminals can be used practically unchanged for the present system according to the invention. If, for example, the vehicle terminal can process only traffic jam reports as traffic information, cost function values adapted by the center for the relevant route edges, to the extent that they correspond to a traffic state resembling a traffic jam, are processed into fictitious traffic jam reports and transmitted in this fashion.

As another feature, the traffic data preparation includes production of traffic events as individual traffic objects that are accordingly identifiable. Such events for example can be assigned to recognized special traffic flow condition such as traffic jams, slow traffic, etc. or to a detected excessive variation in the selected cost function value from a normally expected reference cost function, with the reference cost function value (for example, the cost function value that stands for undisturbed free traffic flow).

As another variation, the traffic data preparation includes generation of delete messages with which specifically the traffic information that was prepared at an earlier point in time can be marked as no longer valid and can be deleted. This prevents earlier traffic information, that is no longer valid because of the traffic situation having changed in the meantime, from being stored too long in the vehicle terminal and possibly distorting other traffic information that depends on it, so that a route that is not longer optimal could be calculated in the vehicle because the resultant cost function values would be incorrect.

Other objects, advantages and novel features of the present invention will become apparent from the following detailed description of the invention when considered in conjunction with the accompanying drawings.

DETAILED DESCRIPTION OF THE INVENTION

Figure 1:
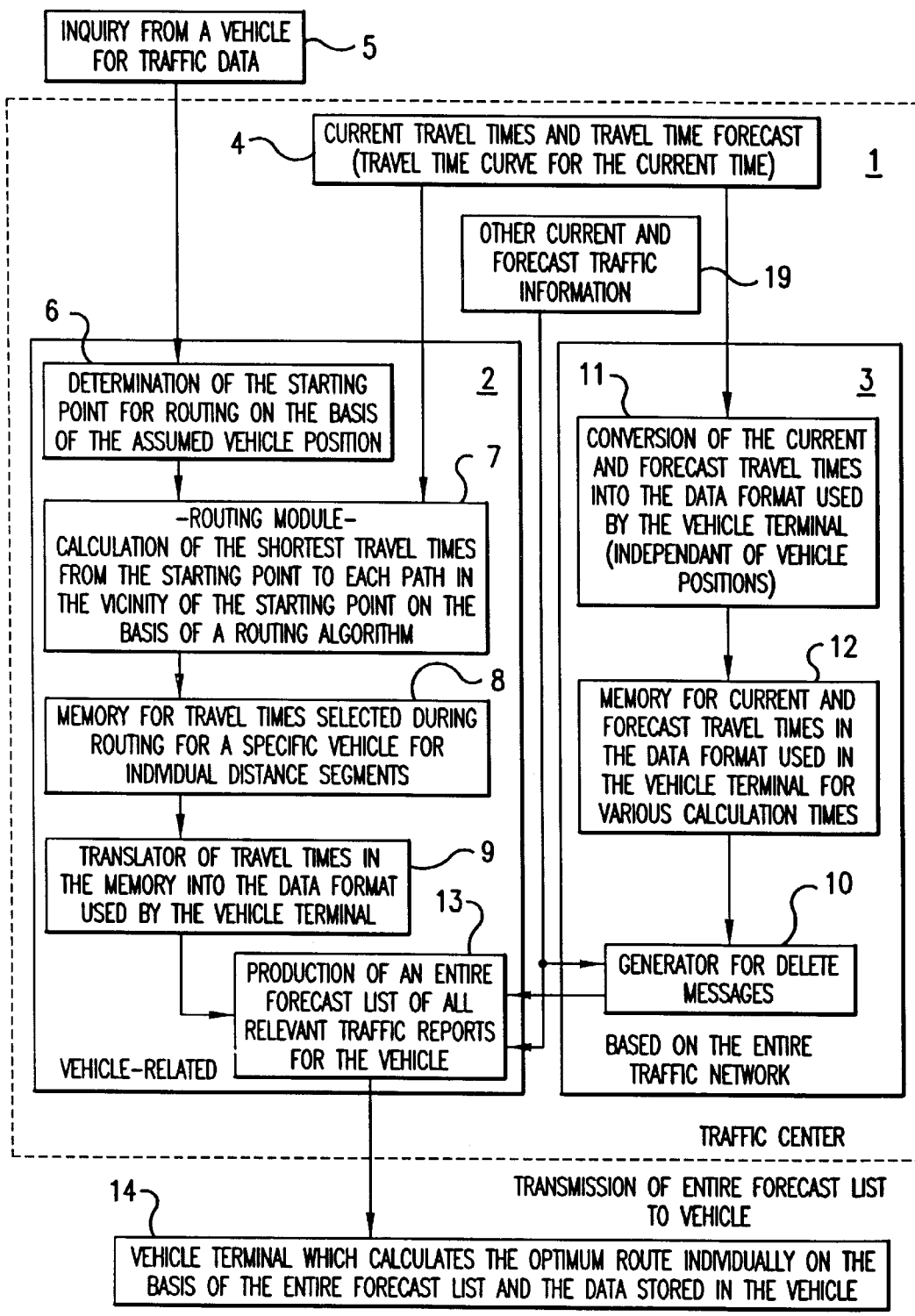
FIG. 1 is a schematic functional block diagram of a method and a device for generating traffic information for a given vehicle in a road network.

FIG. 1 shows a first embodiment of a method according to the invention and a device according to the invention for providing traffic information for a given vehicle in a road network, with the invention being usable alternatively in the same way in different road networks, such as for air, rail, and shipping or combinations thereof. In each case the concept involves traffic information related to the vehicle. That is, any initial conditions of a vehicle in the form of a starting location and a starting time stored in a traffic center and provided so that it not only represents the current and center-based forecast traffic situation, at least in a relevant area of the vehicle in question, but also provides data which is sufficiently small so that it can be transmitted by communications channels conventionally used for this purpose from the data-generating center to each vehicle.

In the present case this is accomplished by specifically selecting current and forecast traffic data available at the center for-the various route paths of the road network that are valid for the arrival time at which the individual vehicle with a forecast trip that starts at a given starting location at a given starting time, continues along a calculated optimum route, and reaches or travels the individual route path. The optimum route is calculated at the center by means of a conventional traffic-dependent route-searching method also known as a routing algorithm, according to the concept that a given traffic-dependent cost function assumes an optimum value. In the embodiments considered, the required travel time is chosen as the cost function, i.e. the optimum route calculated is the one with the shortest travel time from the starting location to the respective route path. However, any other cost function conventionally used for this purpose may be employed, such as, for example the energy or fuel consumption required to have the vehicle travel the route. The traffic data to be selected include in particular the forecast functional value stored in the center, at the respective path for the corresponding arrival time, of the cost function used for the route search. Additional traffic data selected in a timely fashion for a given route path according to the optimum route can also be considered, if needed.

In the system design shown schematically in FIG. 1, traffic center 1, bordered by a dotted line, is provided with a vehicle-related part 2 and a vehicle-independent part 3 that relates to the entire traffic network, as well as a conventional higher-level travel time calculating part 4, in which travel time curves are continuously generated for the various route paths of the specified road network for the current forecast periods and for specified forecast time periods. Another unit 19 provides special current and forecast traffic information, as needed, which are obtained, for example, from outside information sources.

Questions about traffic data or traffic information can be sent to center 1 by vehicles in the system via transmitters 5. Such inquiries contain, in particular, information about the starting location, the current location of the vehicle, and information from which the location can be estimated at the center and then assigned to a nearby path in the network. Furthermore, the center determines starting conditions for which traffic information is desired. In estimating the vehicle location, any information about the present travel direction of the vehicle can be included to make the correct choice between two opposite paths that run parallel, representing the two travel directions on a highway for example. The inquiry is supplied to a starting condition determination unit 6 at center 1 which extracts from it the above-mentioned starting conditions for providing traffic information, i.e. especially the starting location and the starting time.

The starting condition determination unit 6 forwards these starting data to a routing module 7 downstream that belongs to the vehicle-related central part 2. This module 7 calculates, for a road network partial area shown schematically in FIG. 2 at starting location S, the route that is optimum with respect to the cost function "travel time" for a trip beginning at initial point in time to from starting point S to any route path p=1, 2, . . . in the vicinity of starting point S on the basis of a traffic-dependent route-searching method that takes into account the current and forecast traffic situation, also called the routing algorithm. Such routing algorithms are known of themselves and therefore require no further explanation here.

The required traffic data is obtained by the routing module 7 from the higher-order travel time calculating unit 4. The calculation of the optimum route, i.e. in this case the route with the shortest travel time from the starting point to any route path, serves to determine the arrival time at which a vehicle leaving starting location S at initial time to reaches the route path in question via the optimum travel route. For this arrival time, from the travel time data stored in the travel time calculation unit 4, for the various forecast times, the corresponding travel time for the route path in question is selected both for additional route calculation and for further processing according to the invention as traffic information to be provided.

Figure 2:
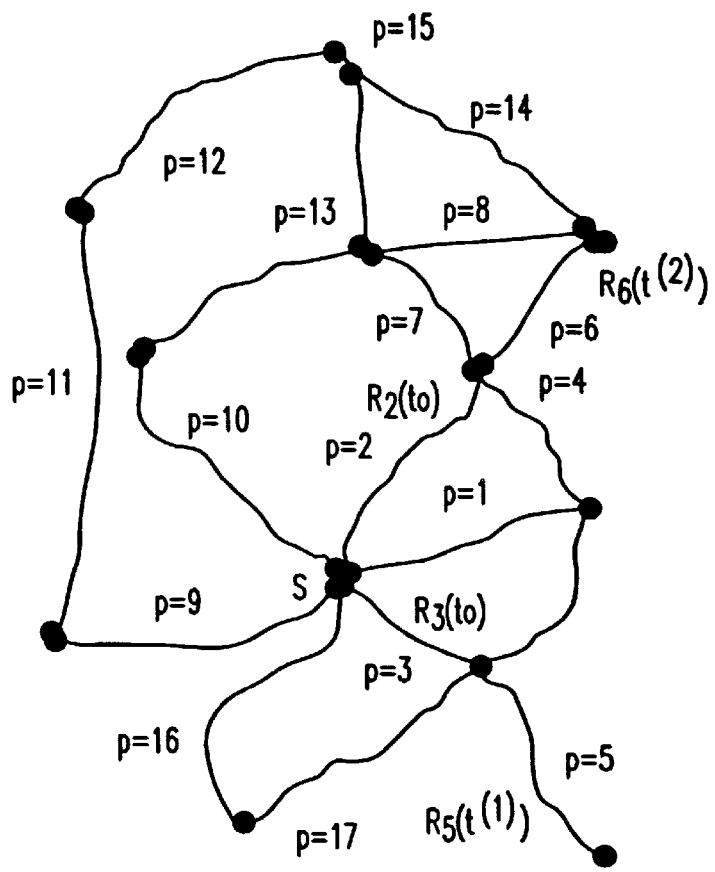
FIG. 2 is a portion of the road network considered in the system in FIG. 1 to show a route search method used.
Figure 3:
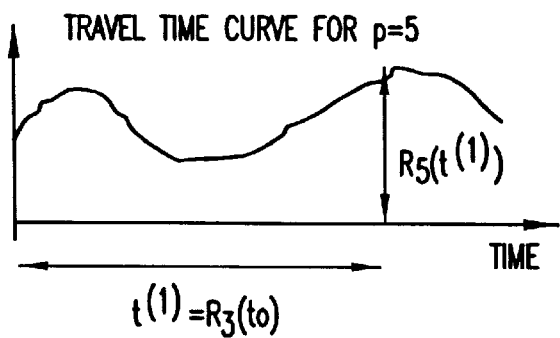
FIG. 3 is a graph of a possible travel time curve for a route path in FIG. 2.
Figure 4:
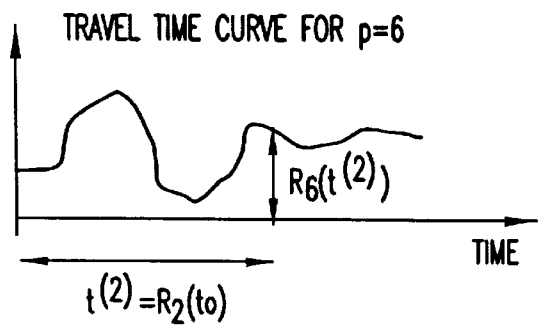
FIG. 4 is a graph corresponding to FIG. 3 but for a different route path.

The selected choice is shown in greater detail in the two concrete examples in FIGS. 3 and 4. FIG. 3 shows, for a selected route path p=5, the travel time curve $R_5(t)$ obtained by forecasting using the travel time calculation unit 4 and stored as a function of time t. As illustrated by the varying curve, the path-specific travel time is usually subject to considerable fluctuations, on the average as a function of time of day, day of the week, etc. as well as by special traffic events such as temporary traffic jams, construction sites, etc. From the travel time curve $R_5$ stored at center 1, the forecast travel time $R_5(t^{(1)})$ is chosen that is associated with the arrival time $t^{(1)}$ at which the route path p=5 can be reached from starting point S, using the optimum fastest route. For this example, the optimum route, as shown in FIG. 2, extends over the route path p=3 from starting location S up to the beginning of route path p=5 with a currently estimated travel time of $R_3(t_0)$.

FIG. 4 shows an analogous example for the selected route path p=6. The optimum path runs via route path p=2 with a travel time $R_2(t_0)$ forecast for the current starting time $t_0$ that therefore indicates the arrival time $t^{(2)}$ for the path p=6. Accordingly, from the forecast travel time data $R_6(t)$ present in center 1 for this path p=6, the corresponding travel time value $R_6(t^{(2)})$ is selected as the traffic information to be prepared for this road section.

Travel times $r_i(t^{(j)})$ selected for each path p=1 for arrival time $t^{(j)}$ according to the corresponding optimum route j, in addition to any additional time-corresponding traffic data about this path, such as, for example, the corresponding arrival time $t^{(j)}$ itself, are suitably prepared by routing module 7 before they are stored in a downstream travel time selector memory 8. The stored values are read out by a following vehicle-related data transformation unit (9) and further processed, which includes translation of the data into a data format that is used in the vehicle systems.

Figure 5:
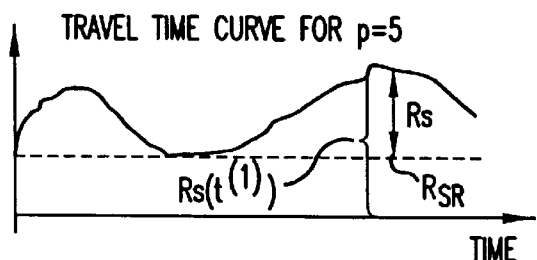
FIG. 5 is a graph corresponding to FIG. 3 to show the generation of an event.
Figure 6:
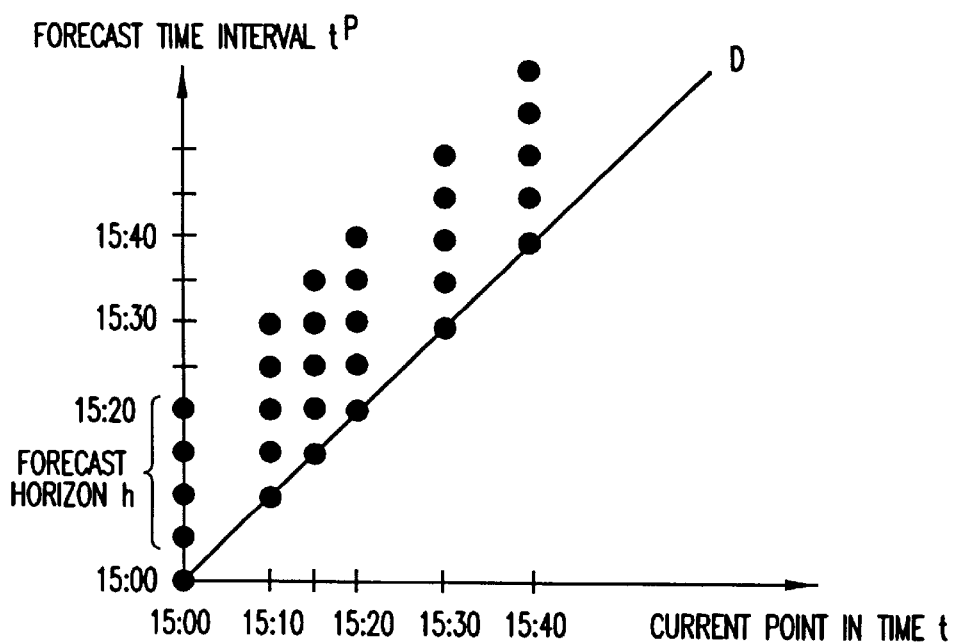
FIG. 6 is a graph illustrating the time-discrete preparation of traffic data.

There are various possibilities for data processing. In a first version, provision can be made so that each selected travel time value $R_i(t^{(j)})$ of the route paths of the starting location environment in question to be considered is considered as travel information explicitly, i.e. as part of a traffic report to be transmitted. Depending on the system intelligence present on the vehicle, versions with better adapted and/or smaller quantities of data to be transmitted are possible. Thus, FIGS. 5 and 6 show a version in which traffic events that can be individualized and hence identified are derived from the selected path-specific travel times which can then be followed in their development over time and reported in traffic news reports as a whole. Alternatively, individual traffic events can be derived directly from measured traffic data instead of from travel times. For this purpose, the time axes are advantageously divided into discrete intervals for both the current point in time and for the forecast times, as is conventional in regular systems. Thus, in the example from FIG. 6 for the current time axis, a discrete interval of 10 minutes is chosen and a forecast interval of 5 minutes is chosen for the forecast time axis. The traffic events generated can be distinguishable traffic objects that can such as traffic jams, slow traffic, free-flowing traffic, etc. It is also possible to compare the selected path-specific travel time with a reference value and if there is a deviation of more than a specifiable threshold value, the deviation is identified as a traffic event. For example, FIG. 5 shows this principle on the basis of the travel time curve for path p=5 according to FIG. 3. As a reference value, a time-constant average travel time $R_{5R}$ is assumed as the reference value and drawn as a dotted line as a forecast for the case of smooth traffic. If the selected travel time $R_5(t^{(1)})$, as indicated, exceeds the reference value $R_{5R}$ by more than a threshold value $R_S$, the development of a corresponding traffic event is assumed for the route path p=5.

FIG. 6 shows one possible procedure for archiving traffic events generated in this fashion with an identifiable event number. Each dot in FIG. 6 symbolizes a point in time within a specific forecast horizon h of 20 minutes, for example, at which the generated event numbers for the traffic events are stored. The corresponding traffic events are periodically calculated at times t and remain valid for the chosen forecast time increment $t^P$ of 5 minutes, for example. The points that lie on diagonal D represent the current traffic data. The dividing of the current time axis into discrete intervals, as stated, can be determined using a fixed interval of 10 minutes for example. Additionally or alternatively however, discrete points can be determined by events. Thus, in FIG. 6, the current point in time 15:15 represents an additional determination time for which, depending on the event, an additional process is performed for determining the traffic information to be generated.

With these traffic events cast as traffic data, it is possible to keep the computation and data transmission cost low because only changes in an event detected once for a corresponding path are prepared as traffic information about this event. Furthermore, it is advantageous, when preparing traffic data to be transmitted, to also provide delete messages by which traffic events that are recognized or reported can be deleted if it is determined, in a current evaluation process that the event in question no longer exists because, for example, a traffic jam that has cleared or the forecast travel time, starting at an elevated value, has again approached the expected value for smooth traffic.

Figure 7:
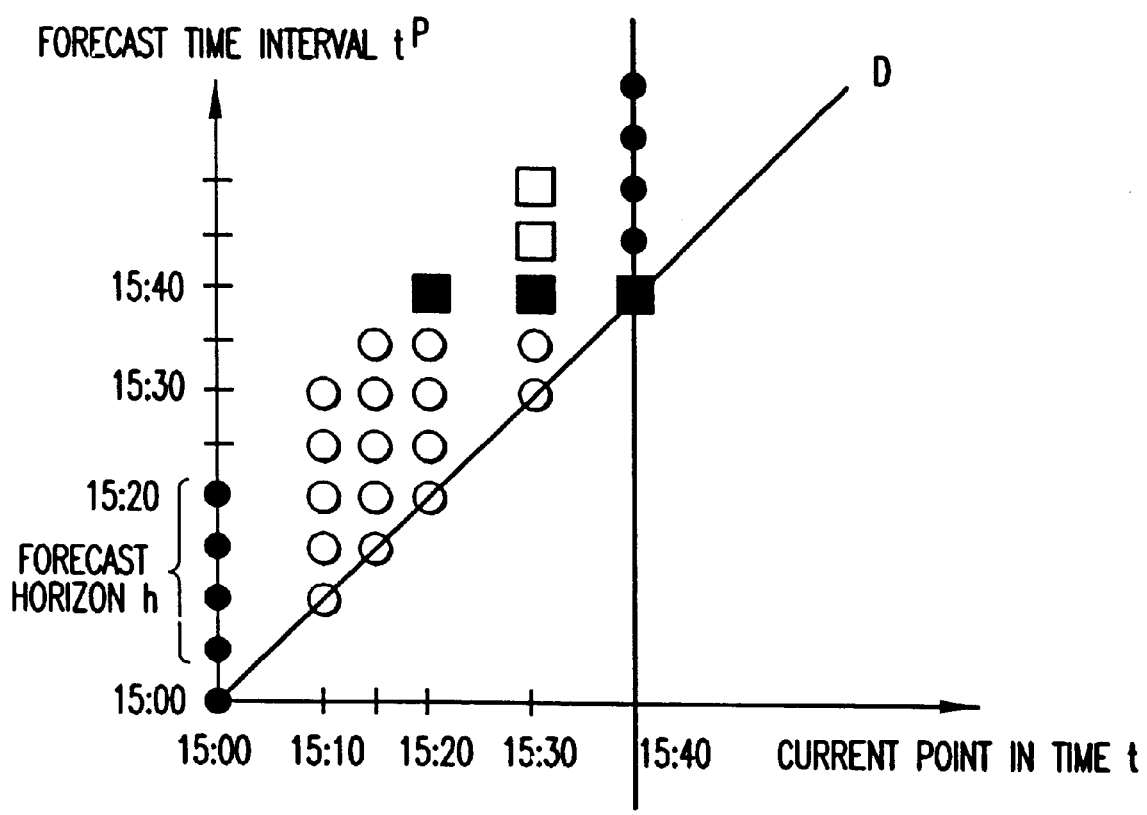
FIG. 7 is a graph corresponding to FIG. 6 showing the production of delete messages.

FIG. 7 shows one possible procedure for generating such delete messages. For a current point in time, delete messages are produced for traffic information forecast earlier, which, at the present time, no longer includes traffic events when they appear in the same fashion in the current traffic information which is repeated for each current point in time. In other words, for each forecast traffic event, whose traffic data no longer exist in the current traffic data, a corresponding delete message is generated. In the graph in FIG. 7, this relates to the solid squares and the empty circles above the diagonal in FIG. 7. In addition, the delete messages for the current point in time contained in the current traffic information are added to a set of delete messages to be formed, which is repeated again for each current point in time. In other words the delete messages are retained from the current traffic data. This refers to the point symbolized by the solid square on the diagonal in FIG. 7. In addition, delete messages for events that are associated with a future forecast point in time are then generated when the events were generated in an earlier determination cycle, but are no longer present in a current determination cycle. Examples of this feature are designated in FIG. 7 by the empty squares.

To generate the delete messages, a corresponding delete message generator 10 is provided in center 1, in the example in FIG. 1, in the vehicle-independent road-network-related part 3 of center 1. This part 3 also contains a transformation unit 11 that receives data about current and forecast travel time data independent of vehicle position from the travel time calculation unit 4 and converts them into a data format used in the vehicle. The transformed data are written by the transformation unit 11 in a corresponding memory 12 which thus contains current and forecast travel time data in a data format used aboard the vehicle for various travel arrival times and can be read by delete message generator 10. In this fashion, the delete message generator 10 can detect, for the individual calculation time, the disappearance of traffic states that existed earlier and hence the corresponding traffic information, and generate the corresponding delete messages. It also takes into account other current and forecast traffic information delivered in addition to that from unit 19. The latter are also supplied to a listener position module 13 located in the vehicle-related part 2 of center 1, which also receives the delete messages from delete message generator 10 and the traffic forecast data from transformation unit 9, selected on a timely basis and transformed into the data format used aboard the vehicle.

From the information supplied, the listener position module 13 generates a complete forecast list of all the traffic data relevant to the inquiring vehicle, i.e. the specified starting location and the specified starting time. These are then transmitted as a traffic report in the form of a complete forecast list to the inquiring vehicle where an optimum route can be determined individually by the vehicle terminal 14 located there on the basis of the traffic data contained in the complete forecast list and the data stored in the vehicle. In other words, based on the path-specific travel time information transmitted in proper time, or equivalent information (and as possibly additional traffic information from the central unit 19 as well), the system aboard the vehicle is able to find an optimum route to a desired destination which does not have to be known to center 1 for the relevant traffic information to be provided. This destination independence of the preparation of traffic information by center 1 according to the present method is very important since the transmission of a destination from the vehicle to a center is frequently undesired. In addition, the procedure according to the invention has the advantage that the traffic information provided for the planned trip that begins at the specified starting time at the specified location remains unchanged and valid even when a possibly envisioned destination changes in the short term.

It is understood that the described method according to the invention can be used similarly when cost functions other than travel time are used, especially for the case when it is not the fastest route but the route with the lowest energy or fuel consumption that is considered the optimum route and is sought. It is also understood that, depending on the application, additional components can be provided in center 1 or components shown in FIG. 1 can be dropped. Thus, a separate data transformation unit in center 1 can be eliminated when the data format used there already corresponds to the data format used in the vehicle. In addition, the division of the various components in center 1, as shown in the example in FIG. 1, is dependent on vehicle-related components and vehicle-independent components that relate to the entire traffic network, but can be varied as needed. Several such versions are shown in FIGS. 8 to 11, where functionally equivalent components are each given the same reference number and, for their detailed description, reference can be made to those in FIG. 1.

Figure 8:
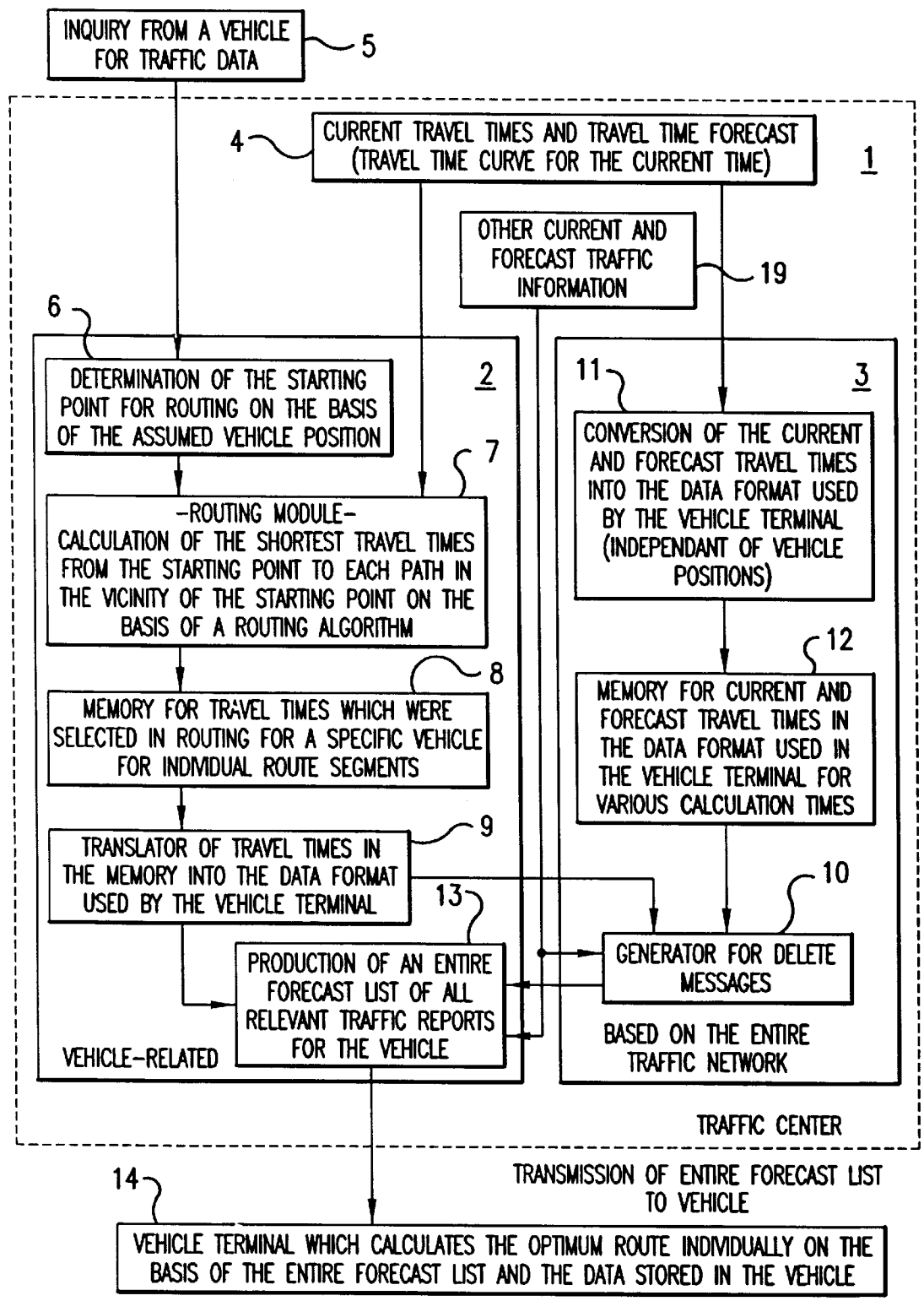
FIG. 8 is a functional block diagram corresponding to FIG. 1 but with delete message generation that relates to the vehicle instead of being independent of the vehicle.

FIG. 8 shows an example in which the delete message generator 10 is located in the vehicle-related part 2 of center 1 and accordingly the delete messages are generated only on a vehicle-related basis. In other words, they are reserved for the initial conditions valid for the respective traffic data inquiry, whereby in this case by comparison with the example in FIG. 1, it receives and evaluates, in addition, the traffic data information from the vehicle-related data transformation unit 9.

Figure 9:
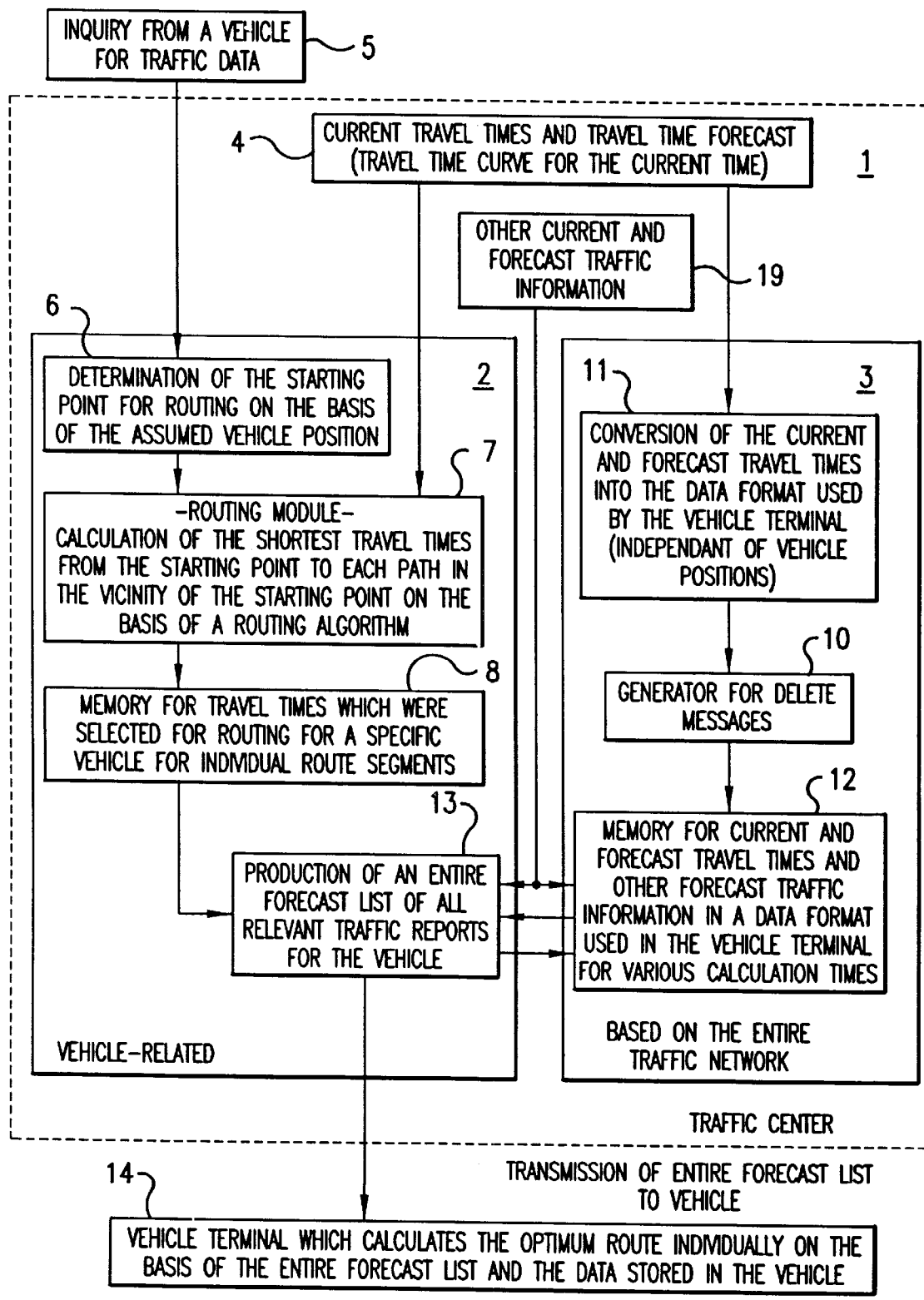
FIG. 9 is a functional block diagram corresponding to FIG. 1 but with data transformation that is independent of the vehicle.

FIG. 9 shows a design for traffic center 1 which differs from the one in FIG. 1 in that, in vehicle-related system part 2, there is no data transformation unit 9 and the memory 12 provided in the vehicle-independent system part 3 of center 1 is set up for storing the delete messages generated by delete message generator 10 and also serves to hold all the other data relevant to preparing the entire forecast list supplied to it by listener position module 13 and unit 19 and can be stored there independently of the vehicle.

Figure 10:
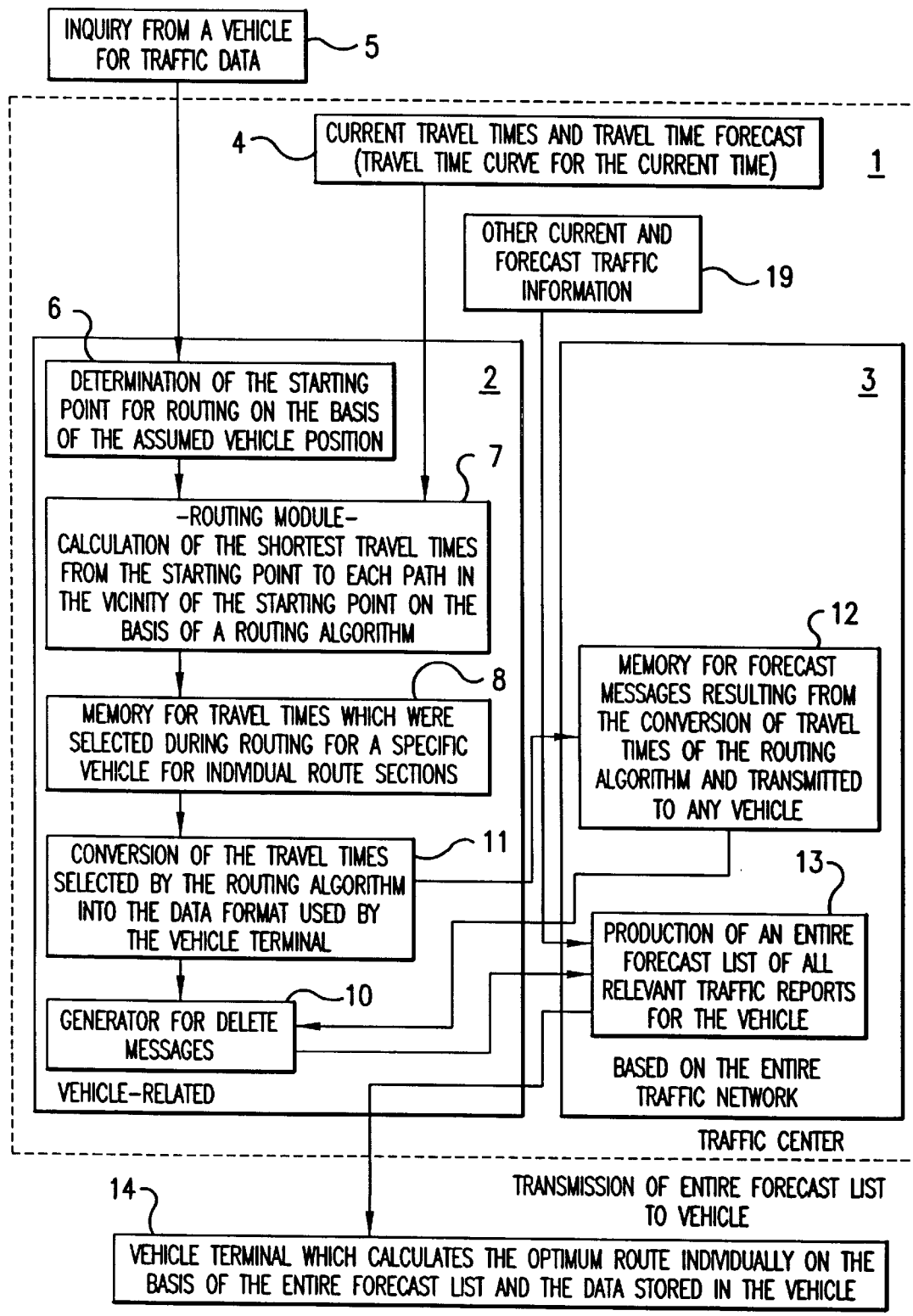
FIG. 10 is a functional block diagram corresponding to FIG. 8 but with vehicle-related data transformation.

The embodiment shown in FIG. 10 corresponds to the one in FIG. 8 with the exception that here not only the delete message generation but also the data transformation take place purely on a vehicle-related basis. Therefore, the transformation unit 11 in vehicle-independent system part 3 of center 1 is omitted and instead the memory 12 located in this system part 3 obtains the traffic information to be stored from the data transformation unit 9 located in vehicle-related system part 2.

Figure 11:
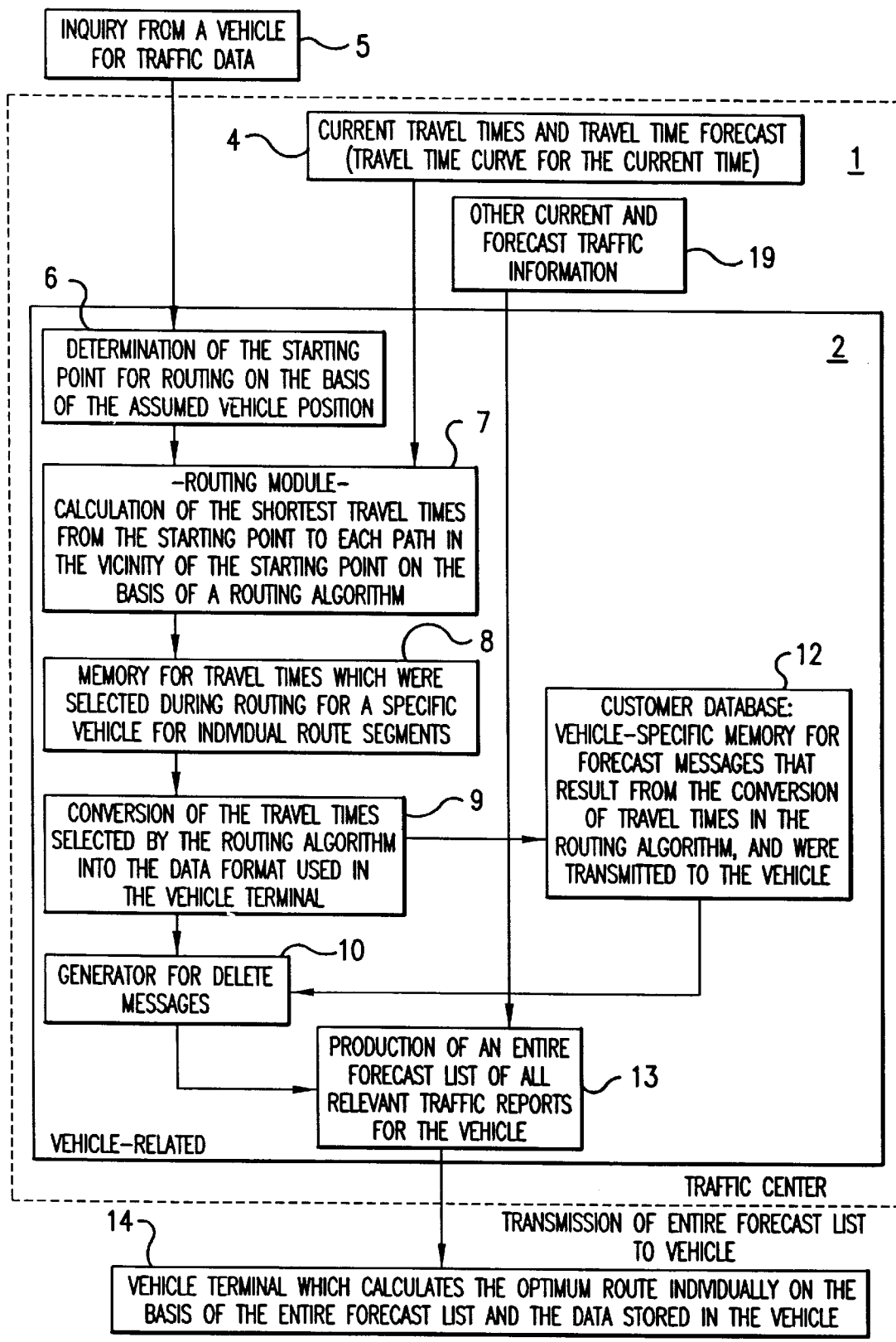
FIG. 11 is a functional block diagram corresponding to FIG. 8 but only with vehicle-related data transformation and vehicle-related data storage of transmitted messages.

The embodiment shown in FIG. 11 corresponds to the one in FIG. 1 with the exceptions that both the generation of delete messages and all other data transformations take place purely on a vehicle-related basis and vehicle-specifically-stored sent messages are stored in the modified memory 12 which forms a customer database. Therefore, all these units are located in the vehicle-dependent system part 2 of the center.

As is clear from the above examples, the traffic information prepared for transmission according to the invention contains at least the information about the arrival time determined on a route-optimized basis from the entire forecast travel time data to which the travel times belong or general cost function values for the various road sections at least of a partial area of the entire basic road network containing the given starting location or information derived from these selected travel time data. In addition, depending on the need, additional arrival time can be considered for the traffic information selected for the respective route path on a timely basis, for example, the respective arrival time itself. In any case, with the present invention, at relatively low expense, central reliable traffic reports about both the latest and the forecast traffic situation can be prepared and transmitted to an inquiring vehicle where they are available for navigation measures of an autonomous guidance system in the proper data format. The volume of data to be transmitted can be kept relatively low and conventional navigation systems in the vehicle can be used because, with the forecast path-specific cost function value data (travel time data) selected according to the invention at the center, by a conventional traffic-dependent route search method, the optimum route to a variably selectable desired destination can be determined in the light of the current and anticipated future traffic state.

As can also be seen from the above examples, the choice of the current and forecast values of the cost function, for example path travel times, which is made according to the invention by a route calculation, lead to the same optimum route that would be calculated with center-based destination guidance systems. In other words, the choice according to the invention of the cost function values using the routing algorithm in the center can result in the quality of the route selection in autonomous guidance systems achieving the quality of center-based guidance. The advantage of autonomous guidance systems over center-based systems, namely that the destination of the vehicle during data processing in the center is not necessary, is retained.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for providing, to a vehicle, current and forecast traffic data for a given starting location on a road network at a given starting time, said method comprising the steps of:

determining a plurality of individual paths in the road network;

providing, at a traffic center, preliminary traffic data including at least current and forecast functional values of a specified traffic-dependent cost function for each of said individual paths, independent of said starting location and said starting time;

performing a traffic-dependent route search to determine a route which optimizes the cost function from the starting location to each respective one of said plurality of paths and determining a corresponding path arrival time;

choosing, for each respective route, one of said current and forecast cost function values which belongs to an associated determined arrival time;

providing at least said chosen cost function values as processed traffic data for the route paths of the network and transmitting said traffic data to said vehicle.

2. A method according to claim 1, wherein the step of providing said processed traffic data includes transforming said data into a data format used in the vehicle.

3. The method according to claim 1, wherein the step of choosing, for each respective route, one of said current and forecast cost function values which belongs to an associated determined arrival time includes the step of producing identifiable traffic events from said chosen cost function values, wherein said traffic events represent previously specified traffic objects and/or chosen cost function values which differ by more than a specified amount from specified reference cost function values.

4. The method according to one of claims 1, further including the step of generating error messages by which identifiable parts of previously prepared traffic data is marked individually as no longer valid.

5. A device for providing traffic information, from a traffic center to a given vehicle in a road network, comprising:

means for providing at least current and forecast functional values of a specified traffic-dependent cost function for each of a plurality of route paths of the road network;

a traffic-dependent route search means for calculating a plurality of routes which optimize the cost function from a starting location to each of said plurality of route paths of the road network;

means for determining a plurality of corresponding route path arrival times for each of said plurality of calculated routes;

means for choosing, for each respective path, one of said current and forecast cost function values which corresponds to said determined arrival time at said each respective path; and means for transmitting to said vehicle at least said chosen cost function values as processed traffic data for each of said route paths of the road network.

6. The device according to claim 5, wherein said traffic center has at least one transformation unit for transforming said processed traffic data in a format that is used in the vehicle.

7. The device according to claim 5, wherein said traffic center further includes a delete generator for producing one of vehicle-related and road-network-related delete messages for marking identifiable parts of previously prepared traffic data as no longer valid.

8. A method for providing traffic information to a vehicle, comprising the steps of:

determining a plurality of individual paths in a road network;

providing, at a traffic center, traffic data including at least current and forecast functional values of a specified traffic-dependent cost function for each of said individual paths;

transmitting, from said vehicle to said traffic center, data indicating a starting location (S) and a starting time ($t_0$);

calculating, by means of a traffic-dependent route search method, a route which optimizes said cost function from said starting location to each of said plurality of route paths of the road network;

determining corresponding arrival times for each of said route paths;

choosing one of the current and forecast cost function values which belongs to the determined arrival time for a respective route path; and processing said chosen value as traffic information and transmitting said traffic data to said vehicle.

9. The method according to claim 8, wherein the step of processing said chosen value further includes the step of generating error messages to delete parts of traffic information which are identified as no longer valid.

10. The method according to claim 8, further including the step of producing identifiable traffic events from the said chosen cost function values wherein said traffic events represent previously specified traffic objects.

11. The method according to claim 8, further including the step of producing identifiable traffic events from the said chosen cost function values wherein said traffic events represent selected cost function values which differ by more than a predetermined amount from a specified reference cost function value.

* * * * *